Figure 1:
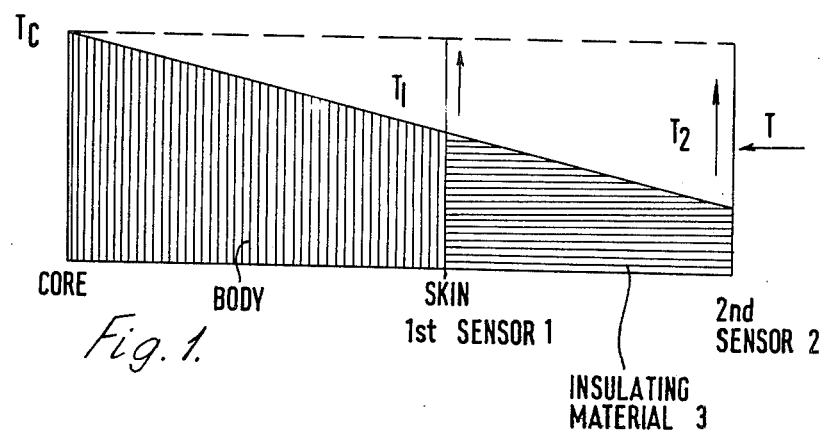

United States Patent
Fox et al.

[11] 3,933,045
[45] Jan. 20, 1976

[54] TEMPERATURE MEASUREMENT

[75] Inventors: Ronald Howard Fox, Chorley Wood; Arthur James Solman, London, both of England

[73] Assignee: National Research Development Corporation, London, England

[22] Filed: Apr. 30, 1971

[21] Appl. No.: 138,916

[30] Foreign Application Priority Data
May 1, 1970 United Kingdom............... 21078/70

[52] U.S. Cl................................ 73/359; 73/DIG. 7
[51] Int. Cl.²...................... G01K 1/16; G01K 7/14
[58] Field of Search...................... 73/DIG. 7, 359

[56] References Cited
UNITED STATES PATENTS

| | | | |
|---|---|---|---|
| 2,798,377 | 7/1957 | Brownlee et al. | 73/342 X |
| 3,217,538 | 11/1965 | Loeb | 73/DIG. 7 |
| 3,321,974 | 5/1967 | Sterbutzel | 73/359 |
| 3,332,285 | 7/1967 | Cook | 73/359 |
| 3,435,400 | 3/1969 | Beckman | 73/362 AR X |

Primary Examiner—Richard C. Queisser
Assistant Examiner—Frederick Shoon
Attorney, Agent, or Firm—Cushman, Darby and Cushman

[57] ABSTRACT

The temperature within a body is measured by covering an area of the body surface with a layer of thermal insulation, measuring the temperature with two sensors located respectively at the insulation/body surface interface and at the opposite side of the insulating layer to indicate any temperature gradient along a path from within the body through the sensors, and applying heat over the insulating layer/sensor sandwich to annul any such gradient. This effectively exteriorises the desired deep body temperature, which is then indicated by the sensors. It is important that the insulation extend laterally beyond the sensors to guard against peripheral temperature gradients affecting the sensor region and to take account of any inherent thermal irregularities in the body. This last point is particularly relevant to clinical use on human subjects with irregularities caused by vascular channels. Similar considerations lead to use of a thin film or similar uniform heating element over the relevant area.

4 Claims, 6 Drawing Figures

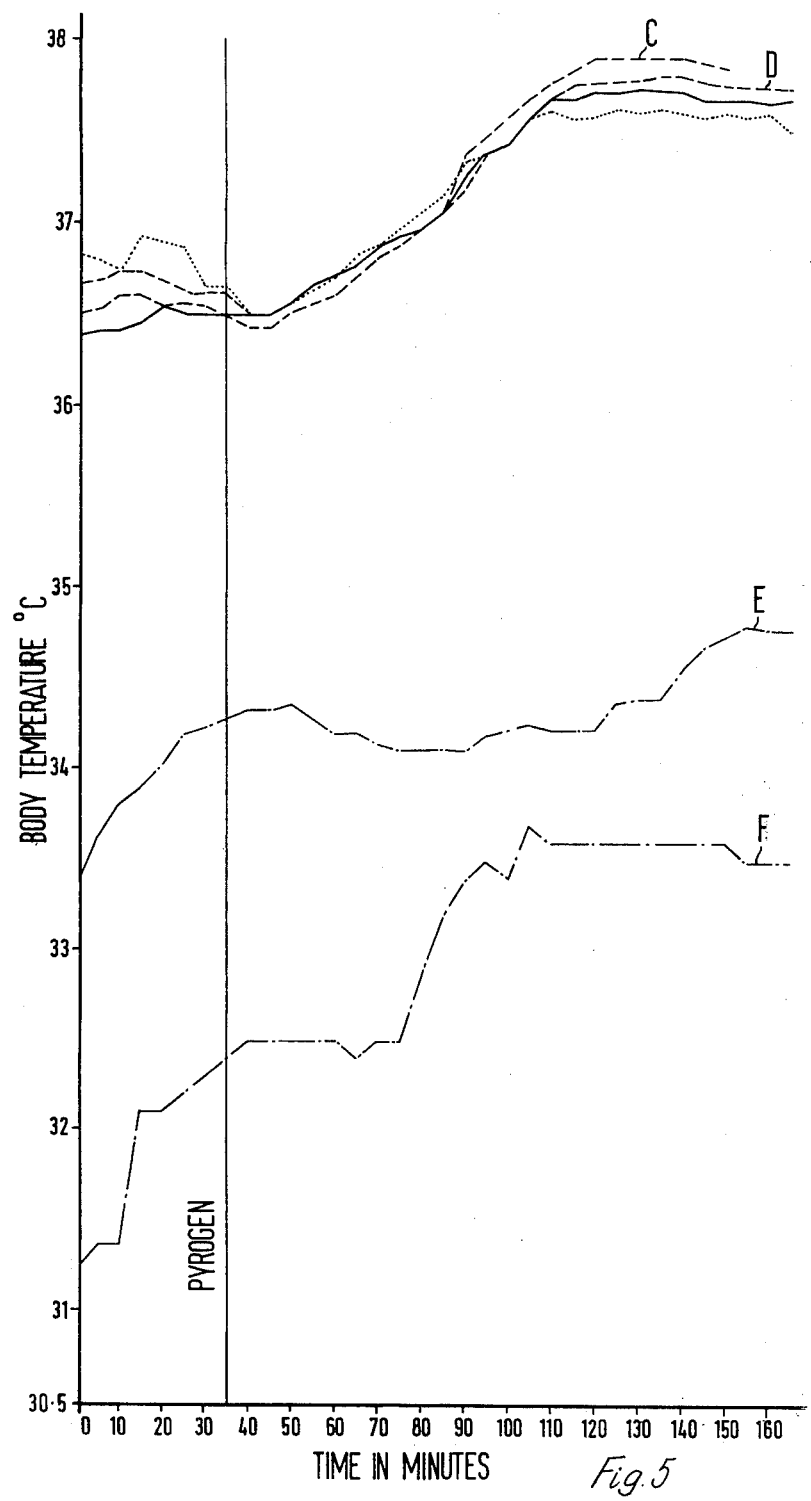

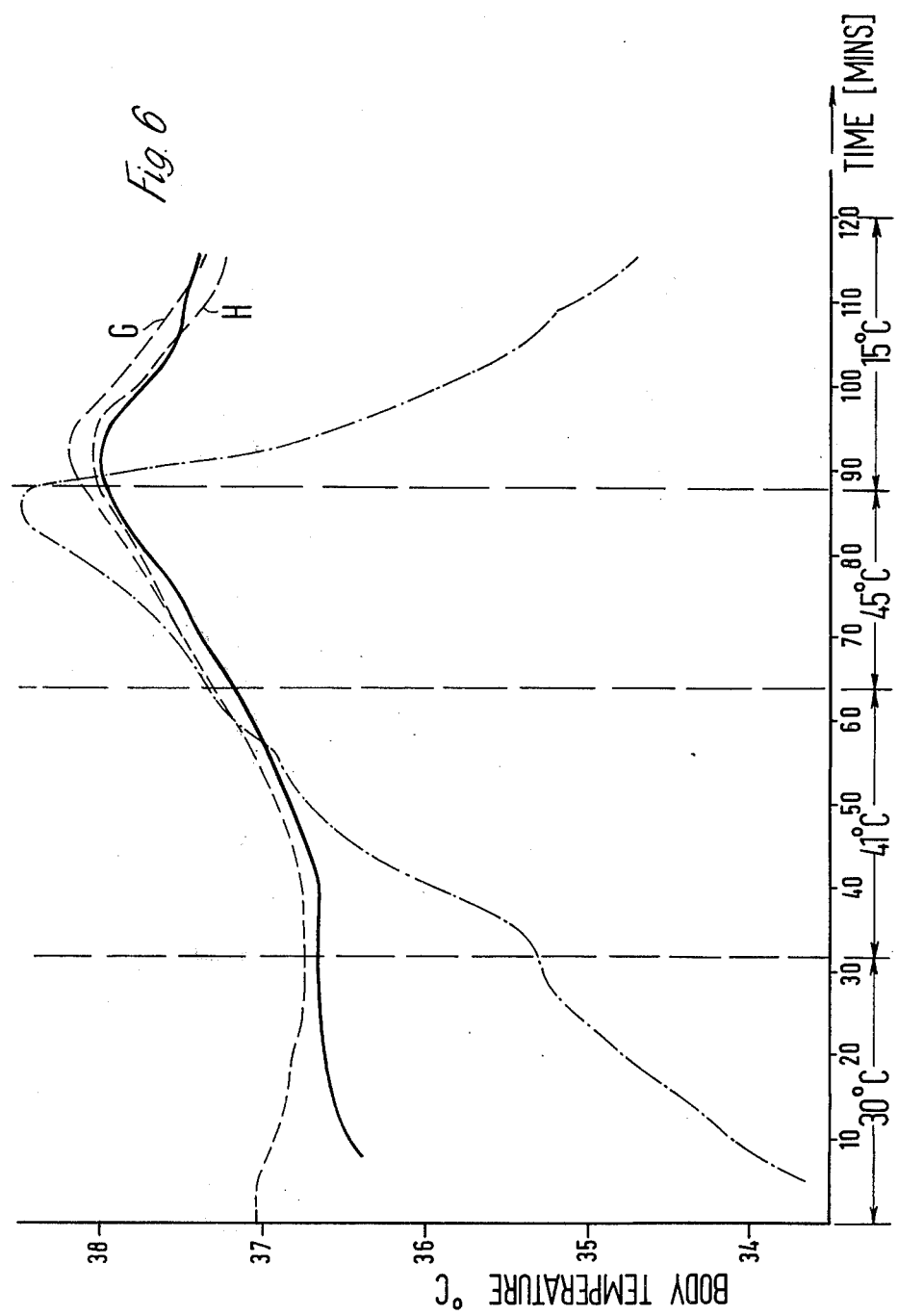

TEMPERATURE MEASUREMENT

This invention concerns temperature measurement and more particularly the measurement of an elevated temperature relative to ambient at a site to which direct access is difficult for one reason or another.

The invention has been more particularly developed for medical use to measure the deep body temperature of a patient through the intact skin. Deep body temperature measurement is in fact carried out as a routine clinical practice in hospitals since the results are of considerable value in certain conditions. However such practice conventionally involves siting of a suitable sensor in a body cavity and this is only tolerable for a relatively short period of time by a conscious patient, and continuously by an unconscious patient. A more particularly useful factor in such measurements is an indication of variation in deep body temperature, but clearly from the preceding comment this is not always available since a relatively long period of detection is involved.

An object of the present invention is to reduce this and similar difficulties, and there is accordingly provided a method of measuring temperature within a body which comrises measuring the temperature at a first location on the surface of said body and at a second location spaced from the first in the direction away from the body, while maintaining a layer of thermal insulating material over the body surface around and between said locations, and heating said layer remotely from the body surface to substantially equate the temperature measurements at said locations.

This method serves to substantially annul heat loss from within the body in a path passing through the two temperature measurement locations whereby the deep body temperature is effectively exteriorised.

The invention also provides apparatus for carrying out the above method and such apparatus preferably comprises a sandwich assembly of two temperature sensors separated by a layer of thermal insulating material which extends laterally beyond the sensors and which sandwich is superposed by an electrical heating element.

Figure 2:
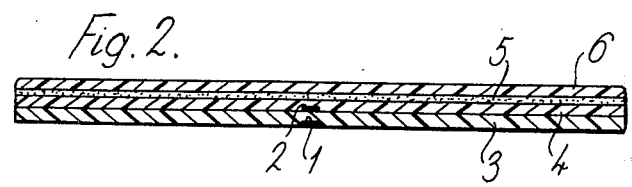
Figure 3:
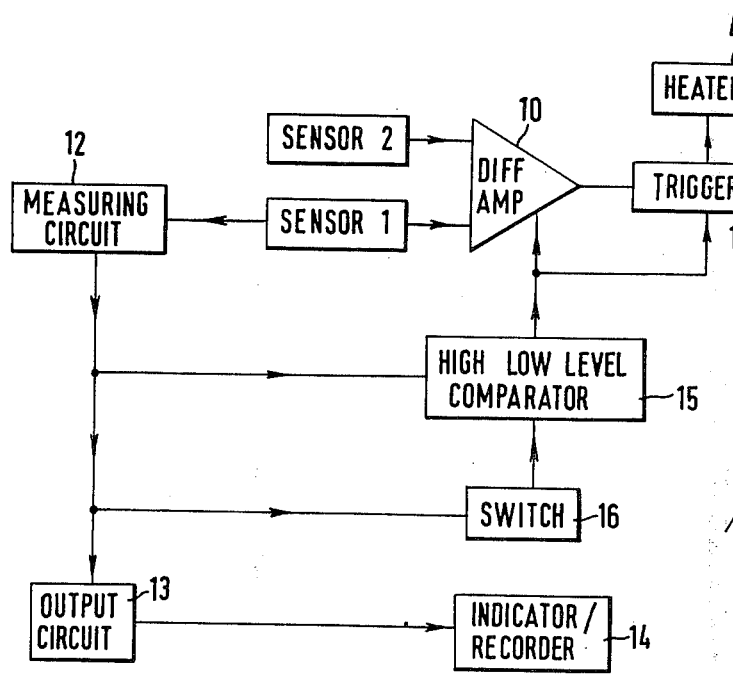
Figure 4:
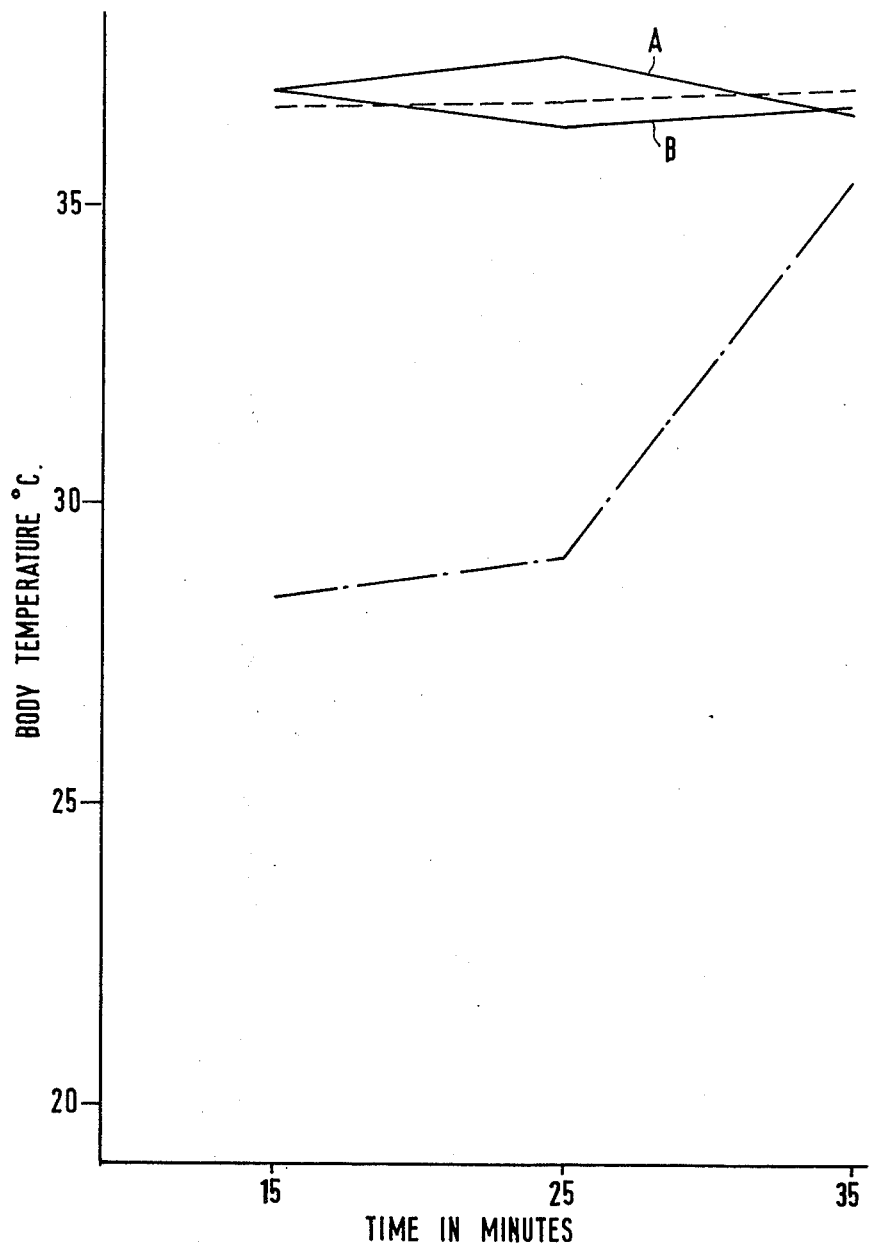

In order that the invention may be more fully understood, the same will now be described by way of example with reference to the accompanying drawings in which:

FIG. 1 graphically illustrates the mode of operation of the invention,

FIG. 2 diagrammatically illustrates an embodiment of the invention,

FIG. 3 schematically illustrates a control system for use with the invention, and FIGS. 4, 5 and 6 graphically illustrate results obtained with use of the invention.

The graph of FIG. 1 illustrates in an idealised manner the temperature gradient due to outward heat loss from a body through an apparatus assembly as indicated above. The temperature within the body is denoted as the core temperature $T_c$, that at the body surface or skin adjacent the innermost sensor is denoted as $T_1$, and that at the outermost sensor as $T_2$. If heat is applied externally as denoted by arrow T to equate the temperature at the two sensors, this involves equating the inward heat flow with the outward heat loss such that the temperature gradient between the two sensors is substantially zero. Clearly, when this is achieved, the whole of the temperature gradient of FIG. 1 is substantially zero and $T_1 = T_2 = T_c$.

The embodiment of FIG. 2 diagrammatically illustrates a preferred embodiment of apparatus for use in carrying out this measurement operation. The two temperature measurement sensors are denoted 1 and 2 separated by a first layer 3 of insulating material and overlaid with a second layer 4 of insulating material. The layers of insulating material extend beyond the sensors in an annulus therearound. A thin film electrical heating element 5 is disposed over the second layer 4 of insulating material and the element 5 is overlaid by a third layer 6 of thermal insulating material. This third layer can overlap the edges of the heating element, and the overall assembly can be covered by a thermal reflecting material except for the exposed face of the insulating layer 3 and the sensor 1. Also, while basically a sandwich, and therefore laminated structure, moulding operations can be used for application of at least some of the insulating material during manufacture.

It is clearly desirable that the sensors to not significantly influence the temperature gradient through the assembly by virtue of their thermal capacity and other characteristics. Also, it is to be noted that the insulating material extends laterally beyond and around the sensors so that the sensors are not significanatly affected by temperature gradient variations in the lateral sense such as will occur in the peripheral and edge regions of the assembly. A furher reason for this ringing of the sensor region with insulating material is that any inherent irregularities in temperature gradients within the body, such as will be caused by the presence of vascular channels, are rendered less significant.

In a prototype assembly which has been used successfully to obtain results as discussed hereinafter, these considerations are met by the use of thermistors as sensors in a pad-like assembly measuring about 6 × 6 cms. The thermisors are, of course, of very small bead-like dimensions compared to that of the pad. However, other sensor arrangements, such as of thin film resistance-type, can be used and this may be advantageous in allowing a greater area of zero average heat transfer to be established to take account of inherent thermal irregularities in a body to be examined, although a more complex electronic control system will then be required. Even then, an insulating ring is still required to guard the measurement area against edge effects, and the lateral dimensions of the insulating layer will normally be at least one order greater than that of the sensors.

It is also clearly desirable that the heating element apply heat substantially uniformly over the insulating layers adjacent the sensors so as not to introduce undesirable temperature gradient variations. It is for this reason that reference is made above to the use of a thin film element. In the prototype assembly also referred to above, such a film comprises a strip of constantan etched on a plastics material film in a closely spaced rectangular waveshape thereover and having about 100 ohms total resistance. The material of the thermal insulating layers around this element can serve to electrically insulate the same, while thermal insulation is desirable between the element and nearer sensor to avoid directly heating the latter, and over the element to improve thermal efficiency.

Additional points to note are that the sensors should be closely matched in respect of temperature response. Also, the insulating material layers, the heating element, and the sensors (if appropriate) should preferably be flexible to facilitate compliance to different body surface contours. This last point is of particular relevance to medical use. In this last case, and possibly others, attachment to the body surface can be effected by use of appropriate adhesive tape or by formation of the assembly as a suction cup. Also, the device need not necessarily be of relatively flat, square pad from as in the prototype.

Turning to the control system of FIG. 3: this has been designed more particularly for use with a transcutaneous deep body temperature measurement device such as described above, although its mode of operation may be useful in other applications of the invention. The basic part of the control system is relatively straightforward and shows the two sensors 1 and 2 connected to a sequence of a differential amplifier 10, a trigger circuit 11, and the heater 4, while one of the sensors (preferably the innermost) is connected through a measurement circuit 12 to an output circuit 13 which can be coupled to a visual output indicator and/or recorder 14. The amplifier operates to trigger the heater on and off to maintain the temperature difference within a predetermine range, of not greater than about ±0.5°C. for medical application, say.

In practice it is desirable that the rate of heating be controlled in such a way as to reduce any tendency for overshoot to the required temperature balance range, such as by use of a unity duty cycle, that is to say by use of an operative cycle in which the heater is alternately energised and de-energised during successive equal intervals of time. However, this may lead to delay in the initial warming up period when temperature $T_2$ will be normally somewhat less than $T_1$, and similarly as between $T_1$ and $T_c$. Accordingly, a comparator 15 is provided whereby control of the heater by the amplifier and trigger circuit is inhibited, while heating is effected continuously until the measured temperature attains a first predetermined high level. This first high temperature level is set close to the normal deep body temperature. A suitable high temperature level is 37°C. Once this high temperature level is reached, a switch 16 is activated to modify the comparator for operation with reference to a second predetermined low temperature level, and thereby to free the amplifier and trigger circuit for heater control. This second, low temperature level is adjustable to determine a temperature significantly lower than that of the high level, at which lower temperature continuous heating can occur again. The low temperature level will, in fact, normally be set at a value below the deep body temperature range at hand so that continuous heating only occurs during the initial phase of any one measurement operation.

This mode of control is suited both to longer term monitoring or periodic routine temperature measurements. However, in the latter case, where a sequence of measurements are taken on different subjects in one routine session, it will probably be preferable that the heating be arranged to attain and maintain the high temperature level during the intervals between successive measurements, rather than attain this level and then automatically switch to another, with the user effecting switching to and from the measurement control upon application of the device to and from each subject.

Also, in this last case, it is desirable that the device have as small a thermal capacity as possible, consistent with other considerations leading to larger pad-like form, in order to reduce the time required for each measurement. In this connection, reduction of the above-mentioned prototype to about 2.5 x 2.5 cms size is practicable.

Such control systems are well automated in operation and, when combined with a skin attachment device as already described, provide an apparatus which is readily usable by personnel such as nurses without the need for significant specialised training.

Lastly, it is useful to indicate the relative accuracy and usefulness of the invention, at least for medical purposes, in the context of known variations in deep body temperature compared to skin temperature. Various tests have been carried out during development of the invention and some of the associated results are indicated by the graphs of FIGS. 4 to 6.

The results of FIG. 4 were derived from tests on subjects in a wind tunnel with wind speed at approximately 100ft/min., relative humidity about 4% and fixed ambient temperatures of 15°C., 25°C. and 35°C. in successive trials. Temperature measurements were made after 45 minutes in each trial at sites at the right lower rib cage and upper sternum by use of the present invention, these being denoted by respective solid lines A and B. Control measurements were also taken to indicate deep body temperature using conventional techniques at the left ear, and average skin temperatures were taken, as respectively denoted by the broken and chain lines.

Similar trials with successive changes in the ambient temperatures give temperature measurements plotted against time configuring the general indications of FIG. 4.

The results of FIG. 5 were derived from a test on a subject in a fixed environment at 28°C. and injected after 35 minutes with Pyrogen to simulate a fever. Temperature measurements were taken at 5 minute intervals to indicate deep body temperature by conventional techniques at the left ear and right ear (broken lines C and D, respectively), by "radio pill" (dotted line), and by use of the invention (solid line). Average skin temperature and single site skin temperature measurements were also taken (chain lines E and F, respectively).

The results of FIG. 6 were derived from a test on a subject in a controlled environment at temperatures of 30°C., 41°C., 45°C. and 15°C. during successive periods of time. Temperature measurements were taken at intervals of about 5 minutes to indicate deep body temperatures by conventional techniques at the left ear and right ear (broken lines G and H, respectively), and by use of the invention (solid line). Average skin temperature measurements were also taken (chain line).

These results indicate that use of the invention gives as accurate a measure of deep body temperature as any conventional technique, and affords a comparable monitoring facility. In addition, the invention presents little or nothing in the way of discomfort to a patient, even when conscious, and is not limited in use to particular body sites. This last point is of practical significance in that a deep temperature measurement could be made in a limb, such as a damaged limb possibly suffering impaired blood flow which would affect the relevant temperature, and compared with measurement at the colateral site.

Also the invention may be useful for detection of a region of high metablolism, e.g., a tumor, located below the skin, and may be preferable to the infra-red techniques currently used for this purpose.

In conclusion, it is to be noted that the invention has been described with more particular reference to medical applications since this has been the context of the initial development. However, the invention should find application in other circumstances where there is difficulty in obtaining access to a deep body or core site for temperature measurement and where the temperature in question cannot be adequately calculated from measurement of the surface temperature of the body.

We claim:

1. Apparatus for measuring the core temperature within a body, in a region thereof which is inaccessibly remote from the outer surface of the body, in an instance where the body exhibits a fall in temperature from said region to said surface, comprising:
 a sandwich assembly of two temperature sensors separated by a layer of material resistant to thermal conduction which extends in continuous manner laterally beyond the sensors to form an annulus around said sensors having lateral dimensions of at least equal order to those of said sensors; said sandwich being superposed by an electrical heating element; control means operable in response to a temperature measurement differential indicate by said sensors to energise said heating element to annul said differential, said control means comprising means to energise said heating element continuously to elevate the temperature at one of said sensors to a predetermined high level; and
 switch means operable thereafter to put said temperature differential annulling operation into effect.

2. Apparatus according to claim 1 wherein said switch means is operated automatically in response to attainment of said high level temperature by said one sensor.

3. Apparatus according to claim 2 wherein said control means is operable to re-establish continuous energisation of said heating element, following operation of said switch means, in response to attainment of a predetermined low level temperature by one of said sensors.

4. Apparatus according to claim 1 wherein said one sensor is that further from said heating element.

* * * * *